(12) United States Patent
Chang

(10) Patent No.: US 12,372,696 B2
(45) Date of Patent: Jul. 29, 2025

(54) OPTICAL FILM HAVING MICRO-STRUCTURE AND DISPLAY DEVICE USING THE SAME

(71) Applicant: CM VISUAL TECHNOLOGY CORPORATION, Tainan (TW)

(72) Inventor: Hsin Wen Chang, Tainan (TW)

(73) Assignee: CM VISUAL TECHNOLOGY CORPORATION, Tainan (TW)

( * ) Notice: Subject to any disclaimer, the term of this patent is extended or adjusted under 35 U.S.C. 154(b) by 752 days.

(21) Appl. No.: 17/657,130

(22) Filed: Mar. 30, 2022

(65) Prior Publication Data

US 2023/0314673 A1    Oct. 5, 2023

(51) Int. Cl.
  *G02B 5/18* (2006.01)

(52) U.S. Cl.
  CPC .... *G02B 5/1866* (2013.01); *G02B 2005/1804* (2013.01)

(58) Field of Classification Search
  None
  See application file for complete search history.

(56) References Cited

U.S. PATENT DOCUMENTS

| | | |
|---|---|---|
| 2002/0180902 A1 | 12/2002 | Izumi et al. |
| 2015/0076468 A1* | 3/2015 | Yamaguchi ............. B32B 38/10 |
| | | 156/247 |
| 2015/0293271 A1* | 10/2015 | Miyasaka ............ G02B 5/0268 |
| | | 353/38 |
| 2016/0054489 A1 | 2/2016 | Koshitouge et al. |
| 2016/0306230 A1 | 10/2016 | Yamada et al. |
| 2019/0369297 A1* | 12/2019 | Arima .................. G02B 5/0221 |
| 2020/0319377 A1* | 10/2020 | Kikuchi ................. G02B 1/118 |

FOREIGN PATENT DOCUMENTS

TW           201743483 A     12/2017

* cited by examiner

*Primary Examiner* — Derek S. Chapel
(74) *Attorney, Agent, or Firm* — CKC & Partners Co., LLC

(57) ABSTRACT

An optical film includes a film body and plural micro-structures randomly distributed over the film body. The micro-structures respectively correspond to a plurality of regions. Each of the regions is defined by a same number of auxiliary micro-structures of the micro-structures around a main micro-structure of the micro-structures, and a ratio of an area of a minimum one of the regions to an area of a maximum one of the regions is greater than 0.5 and less than 1.

20 Claims, 19 Drawing Sheets

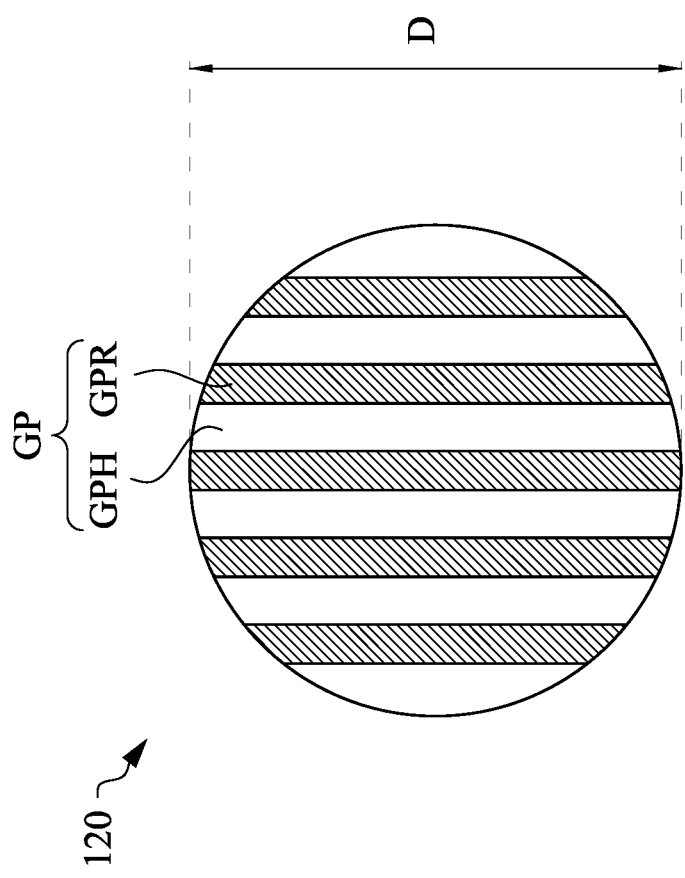

OPTICAL FILM HAVING MICRO-STRUCTURE AND DISPLAY DEVICE USING THE SAME

BACKGROUND

Field of Invention

The present disclosure relates to an optical film having micro-structures and a display device using the same.

Description of Related Art

Over the years, the display has been widely used in various electronic products, such as personal computers, laptops, digital cameras, smart phones, tablets, and LCD TVs. An optical film is an essential element of the display for solving the issues which may possibly arise due to the design of the display. The optical film can be independently formed as a film element or can be coated on other elements in the form of a single-layer or multi-layer coating to improve the display quality through the physical features of the film or the coating material.

SUMMARY

According to some embodiments of the present disclosure, an optical film includes a film body and plural micro-structures randomly distributed over the film body. The micro-structures respectively correspond to a plurality of regions. Each of the regions is defined by an enclosed contour consists of a same number of auxiliary micro-structures which are located around a main micro-structure. The main micro-structure can be randomly picked-up in the whole area. A ratio of an area of a minimum one of the regions to an area of a maximum one of the regions is greater than 0.5 and less than 1.

In some embodiments, the optical film further has an average area density being a ratio of a sum area of the micro-structures to an area of the film body, and the average area density is less than 0.75.

In some embodiments, the average area density is greater than 0.3.

In some embodiments, each of the auxiliary micro-structures has a first portion in said each of the regions and a second portion out of said each of the regions.

In some embodiments, an entirety of the main micro-structure is in said each of the regions.

In some embodiments, each of the regions is a polygon having a plurality of corners over the auxiliary micro-structures.

In some embodiments, the corners of the polygon are respectively at centers of the auxiliary micro-structures.

In some embodiments, each of the regions is a polygon having at least two different inner angles.

In some embodiments, each of the regions is a quadrilateral.

In some embodiments, a first one of the regions has a shape different from that of a second one of the regions.

In some embodiments, a dimension of the micro-structures is in a range from 10 micrometers to 50 micrometers.

In some embodiments, an aspect ratio of the micro-structures is in a range from 0.12 to 1.

In some embodiments, the micro-structures are a plurality of protrusions over a top surface of the film body.

In some embodiments, the micro-structures are a plurality of recesses in the film body.

In some embodiments, the optical film has a zero-order transmittance less than 30% and a 5-degree angle range transmittance less than 50%.

In some embodiments, the zero-order transmittance of the optical film is less than 15%, and the 5-degree angle range transmittance of the optical film is less than 35%.

In some embodiments, the optical film has a 10-degree angle range transmittance less than 50%.

According to some embodiments of the present disclosure, a display device includes a first display and aforementioned optical film. The optical film is disposed on a light output surface of the first display.

In some embodiments, the display device further includes a second display. The optical film is between the first display and the second display.

Based on the above description, the micro-structures of the optical film may be arranged and designed with suitable characteristic dimension, suitable micro-structure average area density, suitable micro-structure distribution uniformity, and suitable aspect ratios, for improving optical quality and having angle-dependent transmittance. The micro-structures may include various shapes, and the micro-structures may be recesses or protrusions.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 8B is a schematic top view of a micro-structure of the optical film of FIG. 8A;

DETAILED DESCRIPTION

Figure 1A:
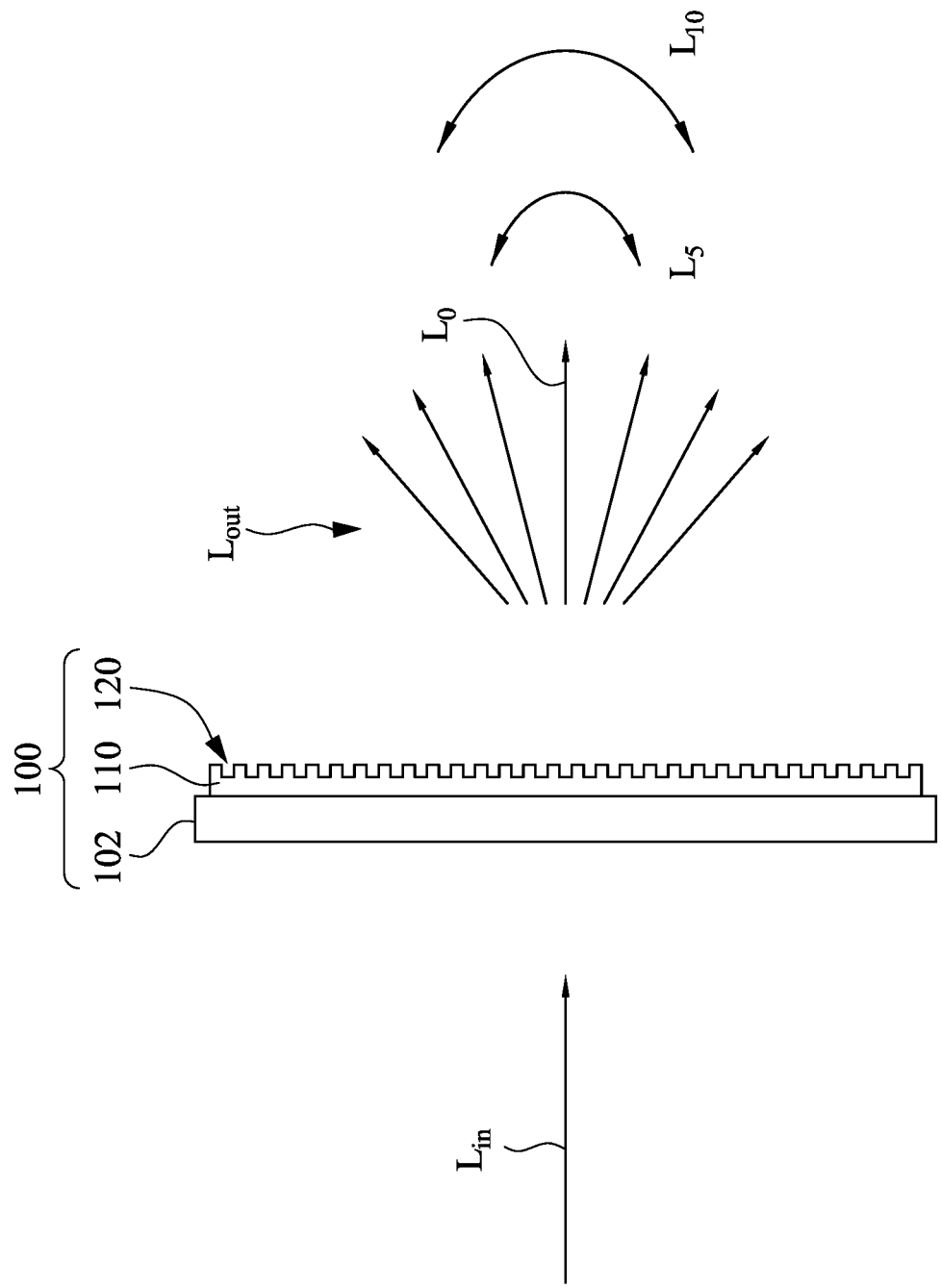
FIG. 1A is a schematic cross-sectional view of an optical film according to some embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1A is a schematic cross-sectional view of an optical film 100 according to some embodiments of the disclosure. In some embodiments of the present disclosure, the optical film 100 is configured to diffract incident light, thereby providing suitable angle-dependent transmittance in an operable wavelength range. The optical film 100 having the angle-dependent transmittance may be used to address color glare (e.g., rainbow reflection) in some display devices. It is noted that the operable wavelength range of the optical film 100 in the context is focused in the visible spectrum (e.g., about 400 nanometers to about 700 nanometers) for display purpose.

The optical film 100 may include a film body 110 and plural micro-structures 120 over the film body 110. For improving optical quality, the micro-structures 120 of the optical film 100 may be arranged and designed with suitable characteristic dimension (e.g., diameter), suitable micro-structure average area density, suitable micro-structure distribution uniformity, and suitable depth-to-width (or height-to-width) aspect ratios. The arrangement and the design make the micro-structure 120 in a random-like distribution. Through the design, the optical film 100 has a zero-order transmittance less than about 30% and a 5-degree angle range transmittance less than about 50% in the operable wavelength range. In some further embodiments, the zero-order transmittance of the optical film 100 is less than 15%, and the 5-degree angle range transmittance of the optical film 100 is less than 35%. In further embodiments, the optical film 100 may have a 10-degree angle range transmittance less than about 50%.

As shown in the figure, when a light (e.g., visible light) $L_{in}$ is normally incident on the optical film 100, an exiting light Lout may be measured at zero degree from the incident direction, in an angle range of +5 degrees from the incident direction, and/or in an angle range of +10 degrees from the incident direction, thereby obtaining a zero-order exiting light $L_0$, 5-degree angle range exiting light $L_5$, and/or 10-degree angle range exiting light $L_{10}$, respectively. The zero-order transmittance is a ratio of the intensity of zero-order exiting light $L_0$ ($P_0$) to the intensity of the incident light $L_{in}$ ($P_{in}$), and can be denoted as $P_0/P_{in}$. The 5-degree angle range transmittance is a ratio of the intensity of 5-degree angle range exiting light $L_5$ ($P_5$) to the intensity of the incident light $L_{in}$ ($P_{in}$), and can be denoted as $P_5/P_{in}$. The 5-degree angle range exiting light $L_5$ encompasses the zero-order exiting light $L_0$, and thus the 5-degree angle range transmittance is greater than the zero-order transmittance. The 10-degree angle range transmittance is a ratio of the intensity of 10-degree angle range exiting light $L_{10}$ ($P_{10}$) to the intensity of the incident light $L_{in}$ ($P_{in}$), and can be denoted as $P_{10}/P_{in}$. The 10-degree angle range exiting light $L_{10}$ encompasses the 5-degree angle range exiting light $L_5$, and thus the 10-degree angle range transmittance is greater than the 5-degree angle range transmittance.

In some cases where the micro-structures are in a periodic arrangement and having a small size (e.g., having a dimension less than 10 micrometers), color glare (also referred to as rainbow reflection) becomes serious, which may degrade display quality.

In some embodiments of the present disclosure, the micro-structures 120 are arranged non-periodically in a random-like distribution and designed with a suitable characteristic dimension (e.g., diameter). For example, by arranging the micro-structures 120 with a suitable micro-structure average area density and a suitable micro-structure distribution uniformity, the non-periodic random-like distribution is realized. The non-periodic random-like distribution may reduce color glare (e.g., rainbow reflection), thereby achieving anti-rainbow effect in some display devices.

Figure 1B:
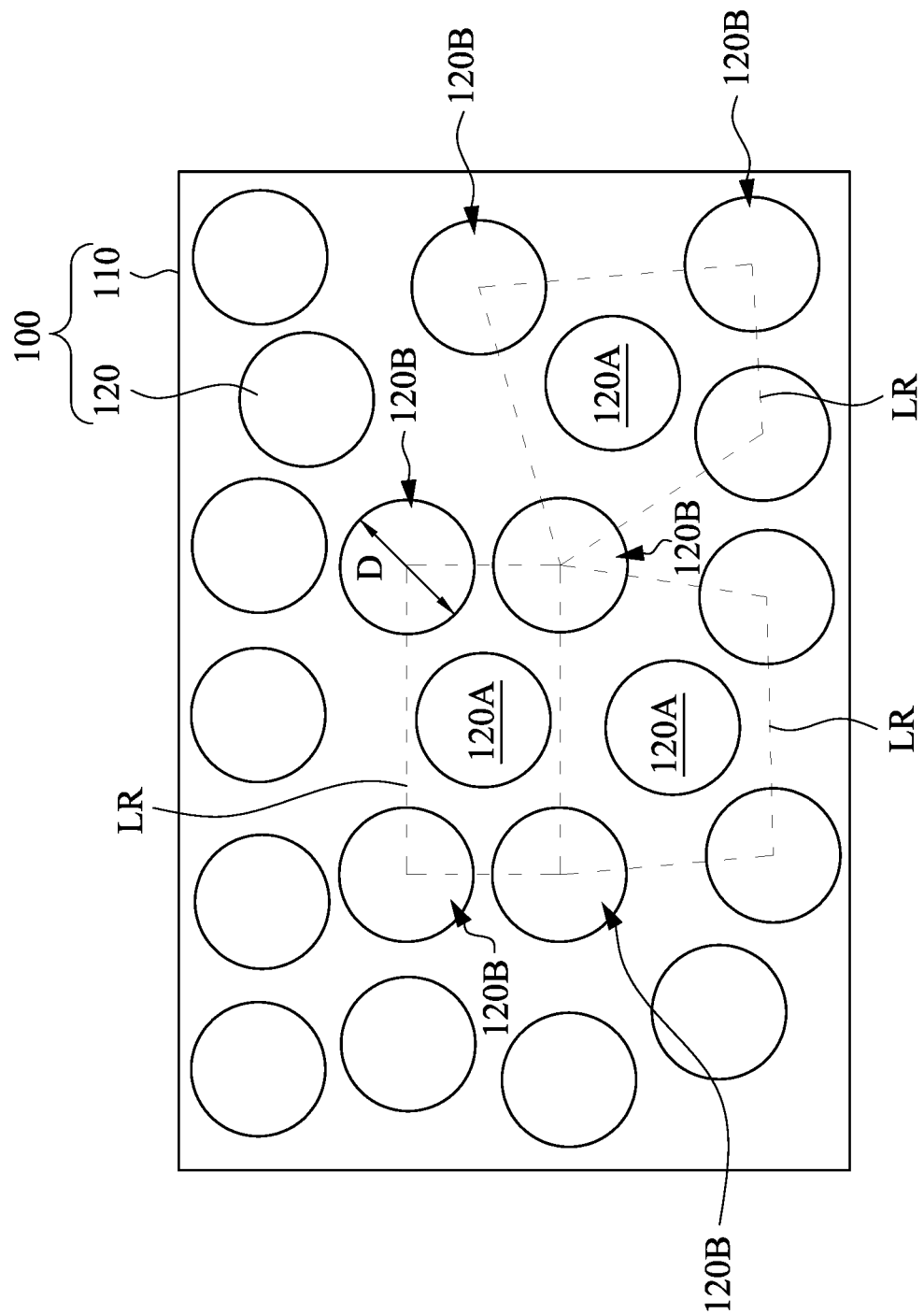
FIG. 1B is a top view of a portion of the optical film of FIG. 1A.

FIG. 1B is a top view of a portion of the optical film 100 of FIG. 1A. A micro-structure average area density of the optical film 100 can be referred to as a ratio of a sum area of the micro-structures 120 to an entire area of the film body 110 of the optical film 100. A micro-structure distribution uniformity of the optical film 100 can be defined as follows:

$$DU = \frac{A_{min}}{A_{max}}$$

DU is the uniformity. $A_{min}$ is an area of a minimum one of the micro-structure defined regions LR. $A_{max}$ is an area of a maximum one of the micro-structure defined regions LR.

In some embodiments of the present disclosure, the micro-structures 120 are respectively correspond to plural micro-structure defined region LR. For example, each micro-structure defined region LR can be defined by selecting a main micro-structure 120A and a same number of auxiliary micro-structures 120B neighboring the main micro-structure 120A, and connecting centers of every two adjacent selected auxiliary micro-structures 120B with a straight line, the plural straight lines forming the micro-structure defined region LR. Stated differently, each micro-structure defined region LR can be an enclosed contour consists of a same number of auxiliary micro-structures located around a main micro-structure, and the main micro-structure can be randomly selected/picked-up in the whole area. The selected number of auxiliary micro-structures 120B may be in a range from 3 to 10. Through the configuration, each of the micro-structure defined region LR is a polygon having a plurality of corners respectively over the auxiliary micro-structures 120B. Furthermore, the corners of the polygon are respectively at centers of the auxiliary micro-structures 120B.

In FIG. 1B, the selected number of auxiliary micro-structures 120B is four, and centers of the four auxiliary micro-structures 120B are connected to form a quadrilateral micro-structure defined region LR in FIG. 1B. In FIG. 1B, the annotated main micro-structure 120A and auxiliary micro-structures 120B are used for identifying a corresponding micro-structure defined regions LR and calculating the micro-structure distribution uniformity (DU), and not intended for limited the scope of the present disclosure.

The micro-structure defined regions LR are used to estimate an area around a target micro-structure (e.g., the main micro-structure 120A) from neighboring micro-structures (e.g., auxiliary micro-structures 120B). The area may be considered as being inverse proportion to a local density of the micro-structures around the target micro-structure (e.g., the main micro-structure 120A). As a result, the plural micro-structure defined regions LR respectively indicate plural micro-structure local densities around the plural target micro-structures (e.g., the plural main micro-structures 120A). A randomness of the distribution of the micro-structures may be estimated from the plural micro-structure local densities. For example, the micro-structure distribution uniformity (DU) may be used as an indicator of the randomness of the distribution of the micro-structures.

The micro-structures 120 of the optical film 100 are designed with the same shape (e.g., circle) and have a same characteristic dimension (e.g., diameter) D in a non-periodic arrangement. In some embodiments of the present disclosure, by the control of the characteristic dimension D, the micro-structure average area density, the micro-structure distribution uniformity (DU), and the depth-to-width (or height-to-width) aspect ratio, the optical film may have various optical performances. Exemplarily fabricated optical films are provided in Table 1, and angle-dependent transmittances of the optical films are measured at a wavelength of about 635 nanometers.

TABLE 1

|  | Optical film #1 | Optical film #2 | Optical film #3 | Optical film #4 |
|---|---|---|---|---|
| diameter | 10 μm | 20 μm | 20 μm | 12 μm |
| micro-structure average area density | 65% | 59% | 50% | 50% |
| micro-structure distribution uniformity (DU) | 68% | 73% | 80% | 38% |
| aspect ratio | 0.5 | 0.41 | 0.15 | 0.5 |
| $P_0/P_{in}$ (zero-order transmittance) | 10% | 14% | 29% |  |
| $P_5/P_{in}$ (5-degree angle range transmittance) | 14% | 24% | 39% |  |
| $P_{10}/P_{in}$ (10-degree angle range transmittance) | 36% | 46% | 50% |  |
| Speckle-solving performance | good | good | very good | poor |
| Anti-rainbow performance | very good | good | fine | poor |

In Table 1, comparing the optical film #4 to the optical film #1, the optical film #2, and the optical film #3, the optical film #4 has a lower micro-structure distribution uniformity (DU) than that of the optical film #1, the optical film #2, and the optical film #3, but has a serious speckle issue. Comparing the optical film #3 to the optical film #1 and the optical film #2. The optical film #3 has a higher micro-structure distribution uniformity (DU) than that of the optical film #1 and the optical film #2, and the optical film #3 has a better speckle-solving performance than that of the optical film #1 and the optical film #2. This indicates that the speckle-solving performance is in a positive correlation with the micro-structure distribution uniformity (DU). As a result, for eliminating the speckle issue, the desired micro-structure distribution uniformity (DU) can be designed to be greater than 0.5 and less than 1. Stated differently, an area of a minimum one of the micro-structure defined regions LR of the optical film 100 is greater than half of an area of a maximum one of the micro-structure defined regions LR of the optical film 100 and less than the area of the maximum one of the micro-structure defined regions LR of the optical film 100. If the micro-structure distribution uniformity (DU) is less than 0.5 (i.e., the area of the minimum one of the micro-structure defined regions of the optical film 100 is less than half of the area of the maximum one of the micro-structure defined regions of the optical film 100), the uneven distribution of the micro-structures 120 may result in serious speckle when displaying.

On the other hand, the optical film #1 and the optical film #2 have better anti-rainbow performances than that of the optical film #3. The data indicates that the anti-rainbow performance is more related to energy distribution (e.g., the angle-dependent transmittances, such as $P_0/P_{in}$, $P_5/P_{in}$, and $P_{10}/P_{in}$) than to DU. The energy distribution (e.g., $P_0/P_{in}$, $P_5/P_{in}$, and $P_{10}/P_{in}$) is mainly affected by aspect ratio and micro-structure average area density.

In some embodiments of the present disclosure, for anti-rainbow performance, the optical film 100 may have a micro-structure average area density less than about 0.75. If the micro-structure average area density is greater than 0.75, the high-density distribution may reduce the randomness and result in high regular pattern, which in turn will cause serious color glare (e.g., rainbow reflection). Comparing the optical film #3 to the optical film #1 and the optical film #2, the optical film #3 has a lower micro-structure average area density than that of the optical film #1 and the optical film #2, and thus the optical film #1 and the optical film #2 have a lower zero-order transmittance, a lower 5-degree angle range transmittance, and a lower 10-degree angle range transmittance than that of the optical film #3. Thus, the optical film #1 and the optical film #2 has a better anti-rainbow performance than that of the optical film #3. For achieving the anti-rainbow performance, the designed micro-structure average area density may be greater than 0.3, or even greater than 0.5. It may be inferred that the designed micro-structure average area density may be in a range from about 0.3 to about 0.75, or a range from about 0.5 to about 0.75 for achieving a good diffraction performance (e.g., energy distribution) and avoiding high regular pattern, thereby achieving the desired anti-rainbow performances.

Furthermore, for achieving the desired diffraction performance (e.g., energy distribution), each of the micro-structures may have a depth-to-width (or height-to-width) aspect ratio in a range from about 0.12 to about 1. The depth-to-width (or height-to-width) aspect ratio may be a ratio of the depth (or height) H to the characteristic dimension D. In some further embodiments, the depth-to-width (or height-to-width) aspect ratio may be in a range from about 0.12 to about 0.5. Through the design, the desired ranges of the zero-order transmittance and the 5-degree angle range transmittance can be achieved.

In some embodiments of the present disclosure, for anti-rainbow performance, the characteristic dimension (or diameter) D of the micro-structures 120 is in a range from about 10 micrometers to about 50 micrometers. If the characteristic dimension D of the micro-structure 120 is less than about 10 micrometers, the dimensions of the micro-structures 120 and the gaps therebetween may be comparable to visible light wavelength (e.g., 400 nanometers to 700 nanometers), and color glare (e.g., rainbow reflection) may become serious. If the characteristic dimension D of the micro-structures 120 is greater than about 50 micrometers, the optical diffraction performance (e.g., energy distribution) may be degraded. The micro-structures 120 may include various shapes, such as circle, an ellipse or a polygon such as triangle, square, pentagon or hexagon. If the micro-structures 120 form a circle, the characteristic dimension D is defined as a diameter. If the micro-structures 120 form a polygon, the characteristic dimension D is defined as a diameter of a circumcircle of the polygon. If the micro-structures 120 form an ellipse, the characteristic dimension D is defined as a long axis (or major axis), a short axis (or minor axis), or an arithmetic average of the long axis (or major axis) and the short axis (or minor axis). In other embodiments, based on the shape of the micro-structures 120, the definition of the characteristic dimension can be adopted from a similar shape.

In some embodiments, a design rule is concluded that the micro-structures 120 are distributed such that a micro-structure distribution uniformity (DU) is greater than 0.5 and less than 1, the micro-structure average area density is less than about 0.75, the micro-structures 120 have a characteristic dimension D ranging from about 10 micrometers to about 50 micrometers, and an aspect ratio ranging from about 0.12 to about 1.

Figure 1C:
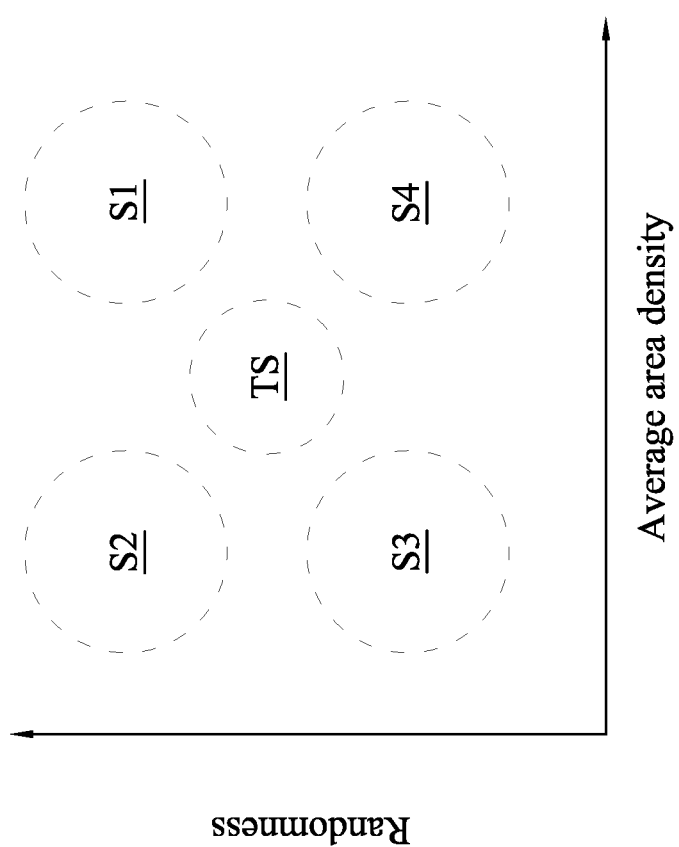
FIG. 1C illustrates a relation between randomness and micro-structure average area density.

FIG. 1C illustrates a relation between randomness and micro-structure average area density. The randomness on the vertical axis may be considered as in negative correlation with the micro-structure distribution uniformity (DU). Four situations S1-S4 are described with respect to the randomness and micro-structure average area density. The situation S1 having high average area density and high randomness does not really exist. In situations S2 and S3, the low average area density would bring out poor optical diffraction performance (e.g., poor energy distribution), such that the optical film may not address color glare (e.g., rainbow reflection) and may show poor optical performance in display devices. Furthermore, in situation S2, the high randomness may further result in speckle issues. In situation S4, the high average area density and low randomness may result in regular arrangement, which may result in serious color glare (e.g., rainbow reflection).

In some embodiments of the present disclosure, the design rule concluded above is directed to a target situation TS having suitable randomness and a suitable micro-structure average area density, thereby making a tradeoff between an optical diffraction performance (e.g., energy distribution), the speckle-solving performance and the color glare (e.g., rainbow reflection).

This design rule makes the micro-structure 120 in a random-like distribution. In some embodiments, this distribution of the micro-structures 120 can be referred to as a random/irregular distribution. In some embodiments, for randomly distributing the micro-structures 120, a first one of the micro-structure defined regions LR has a shape different from that of a second one of the micro-structure defined regions LR. For example, a first one of the micro-structure defined regions LR has a size greater than that of a second one of the micro-structure defined region LR. In some example, a first one of the micro-structure defined regions LR has at least one inner angle or an edge side different from that of a second one of the micro-structure defined region LR. In some embodiments, the micro-structure defined region LR may have at least two different inner angles.

In some embodiments, when preparing a layout of the micro-structures, the micro-structures may be first regularly arranged in an array, and then tuned by adding randomness (e.g., randomness variables) to the arrangement of the micro-structures. The addition of the randomness is performed based on the aforementioned design rule. Of course, more strict design rule may be adopted. The addition of the randomness is performed such that positions of the micro-structures are offset from their original position of regular arrangement, resulting in random-like, random, or irregular distribution. The preparation of the layout of the micro-structures may be performed by a controller. The controller may include a processor, a computer readable medium, and an input/output (I/O) interface. The processor is used to perform calculations related to the design rules. A computer readable medium (also referred to as a database or a memory) is coupled to the processor in order to store data used by the processor and other system elements. Using the processor, the memory, and the I/O interface, a user is able to further the adjust the randomness. The processor may include dedicated circuitry, ASICs, combinatorial logic, other programmable processors, combinations thereof, and the like. The processor can execute instructions and data. For example, the processor embodies at least part of the instructions for arranging the micro-structures according to the designed rule in software, firmware and/or hardware. The memory may include a hard disk drive, flash memory, a floppy disk drive along with associated removable media, an optical drive, removable media cartridges, and other like storage media. The memory can store instructions and data executed by the processor. After the layout of the micro-structures is prepared, the optical film 100 having the randomly distributed micro-structures 120 can be formed by suitable fabrication methods according to the layout.

Referring back to FIG. 1A, in some embodiments, the optical film 100 (or the film body 110) can be a viscoelastic adhesive layer or an elastic adhesive layer formed of such as pressure sensitive adhesive (PSA), rubber-based adhesive or polysiloxane-based adhesive. Examples of suitable viscoelastic adhesive or elastic adhesive include an elastic polyurethane-based adhesive or a polysiloxane-based adhesive, a styrene-block-copolymer-based adhesive, a (meth) acrylic-block-copolymer-based adhesive, a polyvinyl ether-based adhesive, a polyolefin-based adhesive, and a polymethacrylate-based adhesive. In another embodiment, the optical film 100 (or the film body 110) can be a crosslinked resin layer or a soluble resin layer. Examples of suitable material of the crosslinked resin layer include thermosetting resin or UV curing resin formed of such as a (methyl) acrylic-based resin, a urethane-based resin, a (meth)acrylic urethane-based resin, an epoxy-based resin, or a polysiloxane-based resin. The micro-structures 120 may be formed on the film body 110 by ways of engraving, embossing, transferring or printing. In the present embodiments, the micro-structures 120 are recesses in the film body 110. In some alternative embodiments, the micro-structures 120 may be protrusions over a top surface of the film body 110. In some embodiments, the optical film 100 may include a transparent support 102 supporting the film body 110. The transparent support 102 may be made of polymethyl methacrylate (PMMA), polyethylene terephthalate (PET), triacetate cellulose film (TAC), polymeric material, the like, or the combination thereof. The transparent support 102 may include a material the same as or different from that of the film body 110, depending on the fabrication process.

Figure 2A:
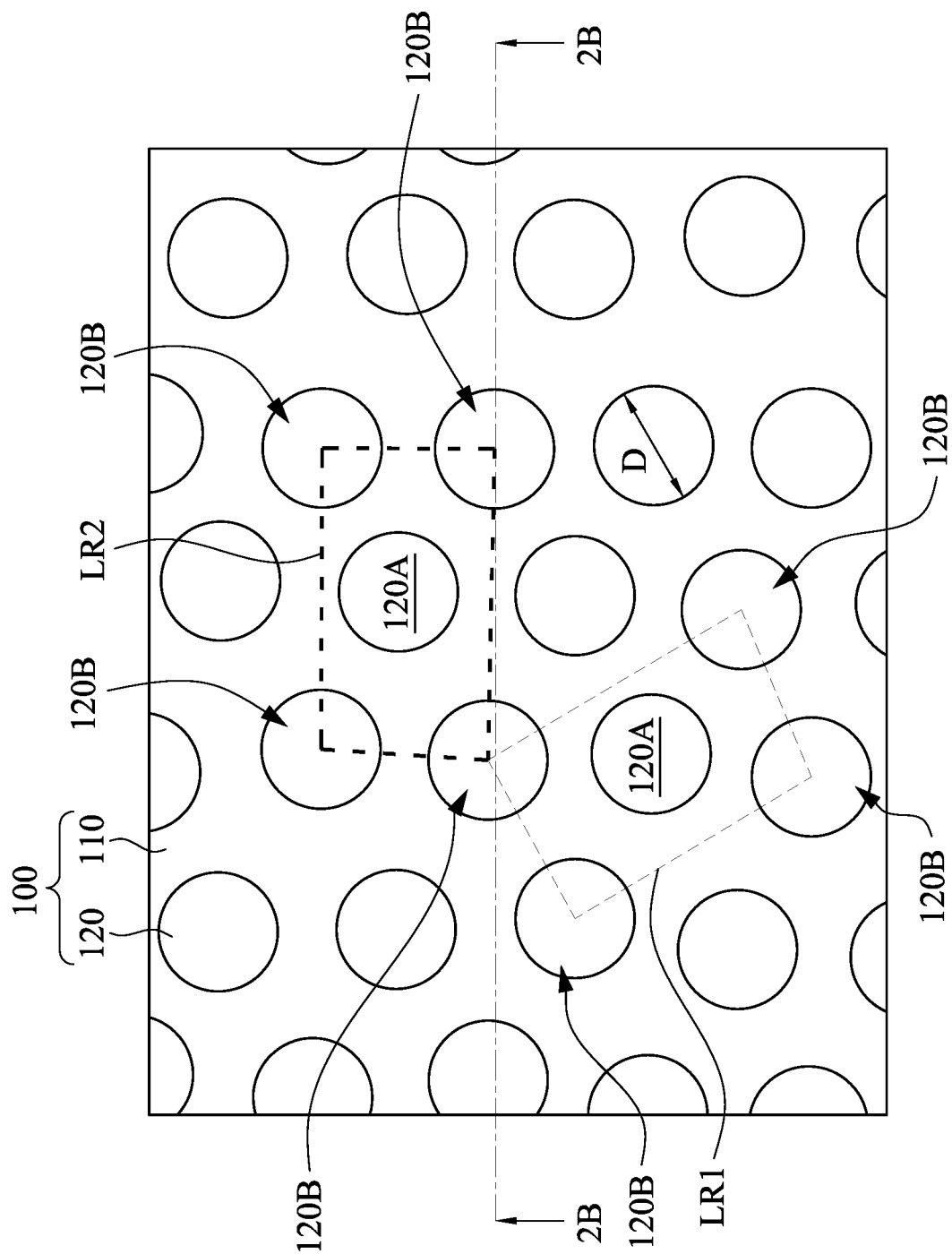
FIG. 2A is a top view of an optical film according to a first embodiment of the disclosure with quadrilateral micro-structure defined region.
Figure 2B:
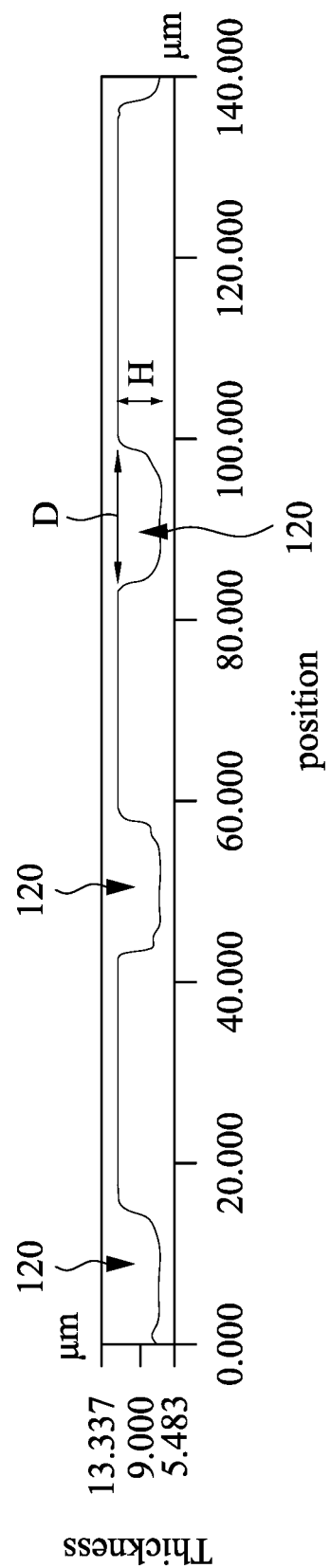
FIG. 2B is a cross-sectional view taken along line 2B-2B in FIG. 2A.

FIG. 2A is a top view of an optical film 100 according to a first embodiment of the disclosure with quadrilateral micro-structure defined region. FIG. 2B is a cross-sectional view taken along line 2B-2B in FIG. 2A. In the first embodiments, each of the micro-structures 120 may have a circle top view having a diameter D of about 16 micrometers. The average area density of the micro-structures 120 of the optical film 100 is about 0.38. The micro-structure distribution uniformity (DU) is about 0.99. In the first embodiments, the micro-structures 120 are recesses, and each of the micro-structures 120 may have a depth-to-width aspect ratio of about 0.29. The depth-to-width aspect ratio is a ratio of the depth H to the characteristic dimension D in FIG. 2B.

Figure 3A:
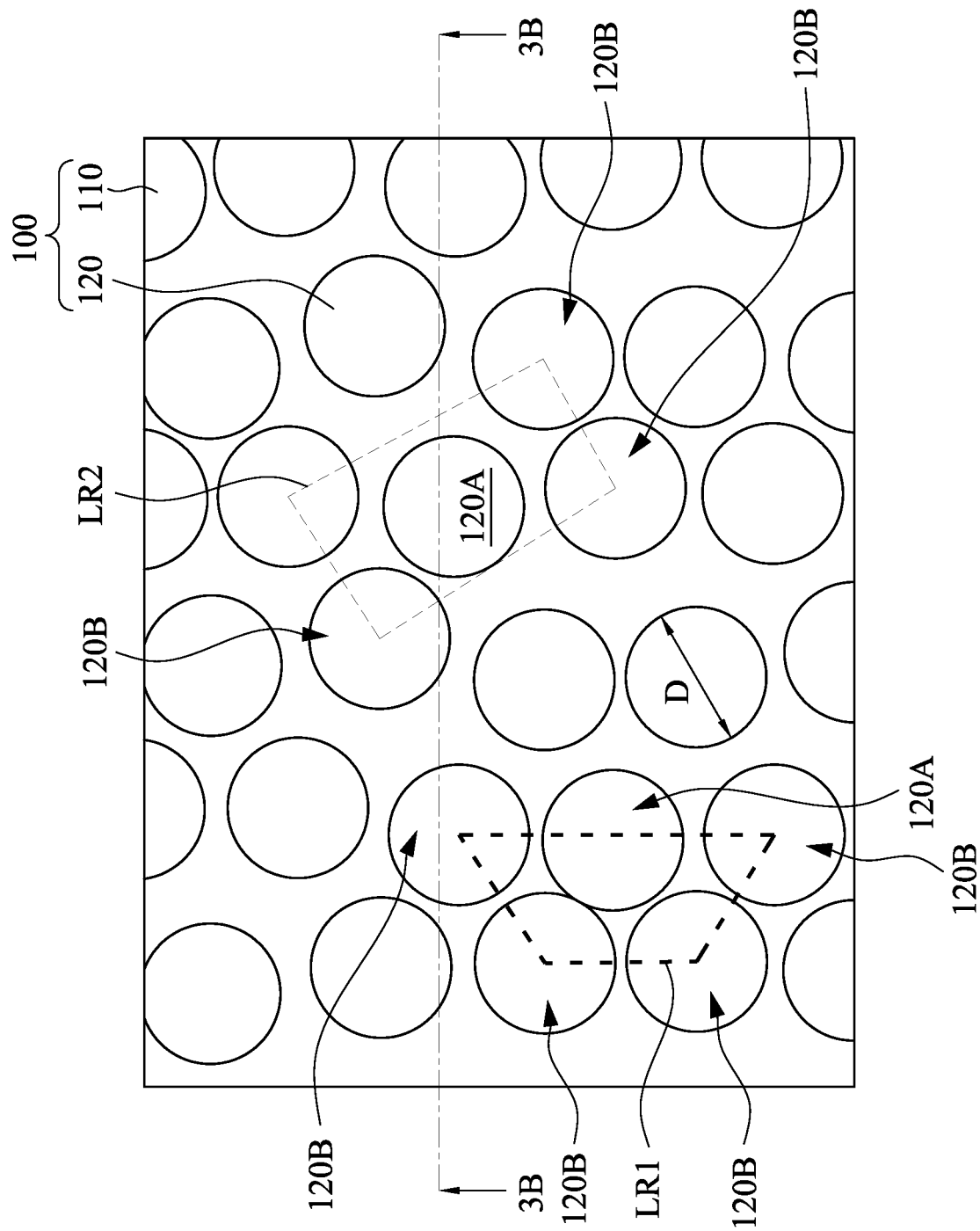
FIG. 3A is a top view of an optical film according to a second embodiment of the disclosure with quadrilateral micro-structure defined region.
Figure 3B:
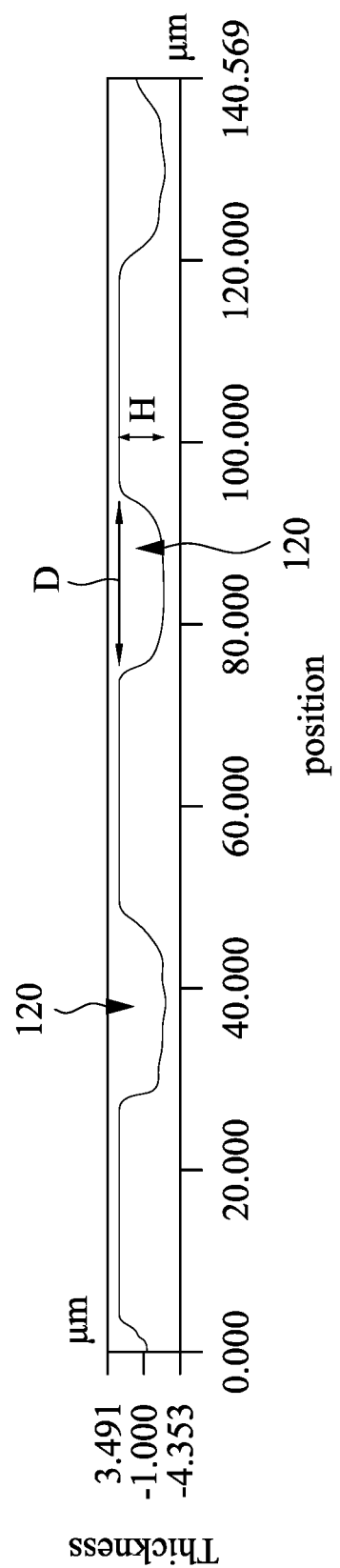
FIG. 3B is a cross-sectional view taken along line 3B-3B in FIG. 3A.

FIG. 3A is a top view of an optical film according to a second embodiment of the disclosure with quadrilateral micro-structure defined region. FIG. 3B is a cross-sectional view taken along line 3B-3B in FIG. 3A. In the second embodiments, each of the micro-structures may have a circle top view having a diameter D of about 20 micrometers. The average area density of the micro-structures of the optical film 100 is about 0.59. The micro-structure distribution uniformity (DU) is about 0.726. In the second embodiments, the micro-structures 120 are recesses, and each of the micro-structures may have a depth-to-width (or height-to-width) aspect ratio of about 0.287. The depth-to-width aspect ratio is a ratio of the depth H to the characteristic dimension D in FIG. 3B.

Figure 4A:
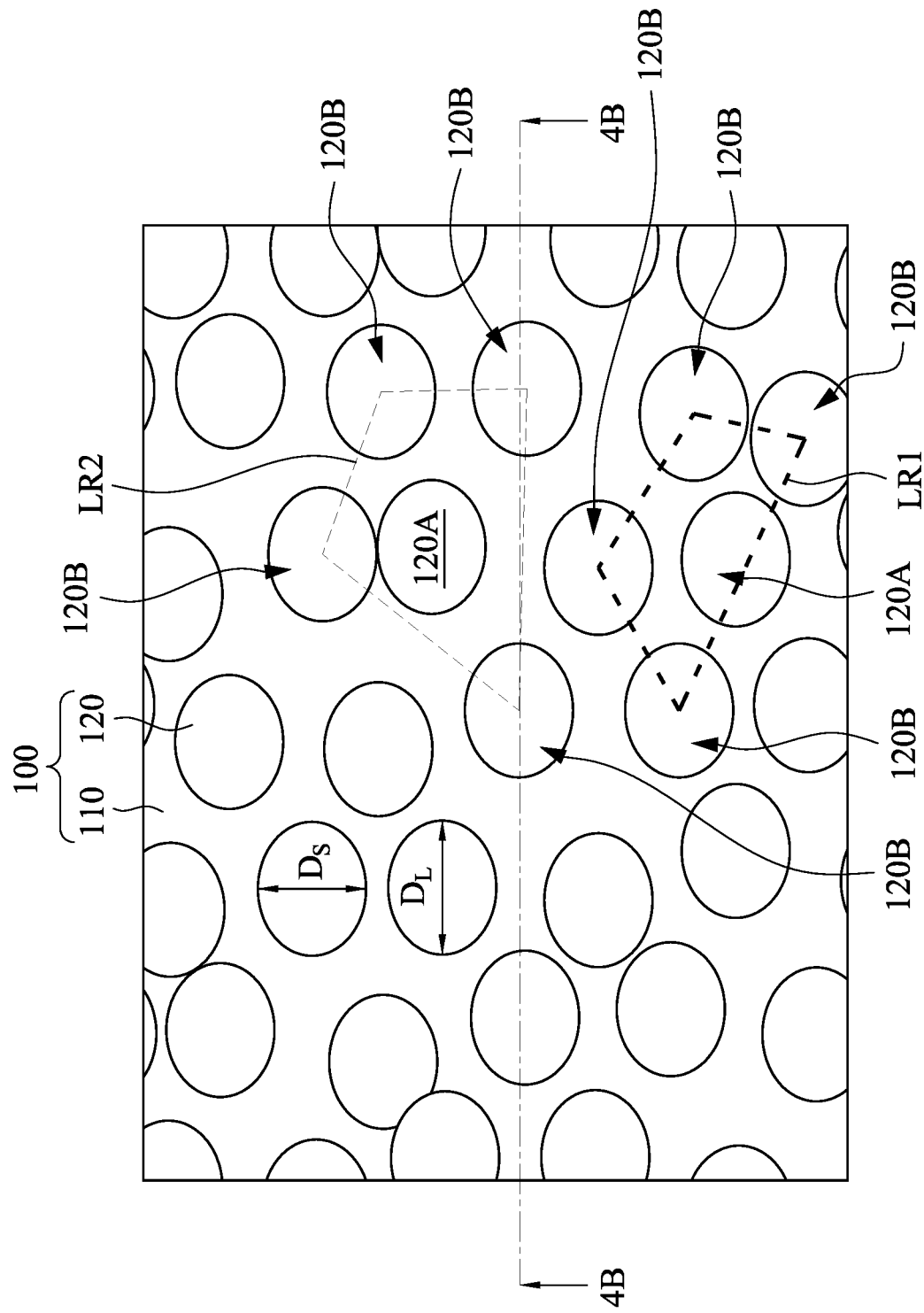
FIG. 4A is a top view of an optical film according to a third embodiment of the disclosure with quadrilateral micro-structure defined region.
Figure 4B:
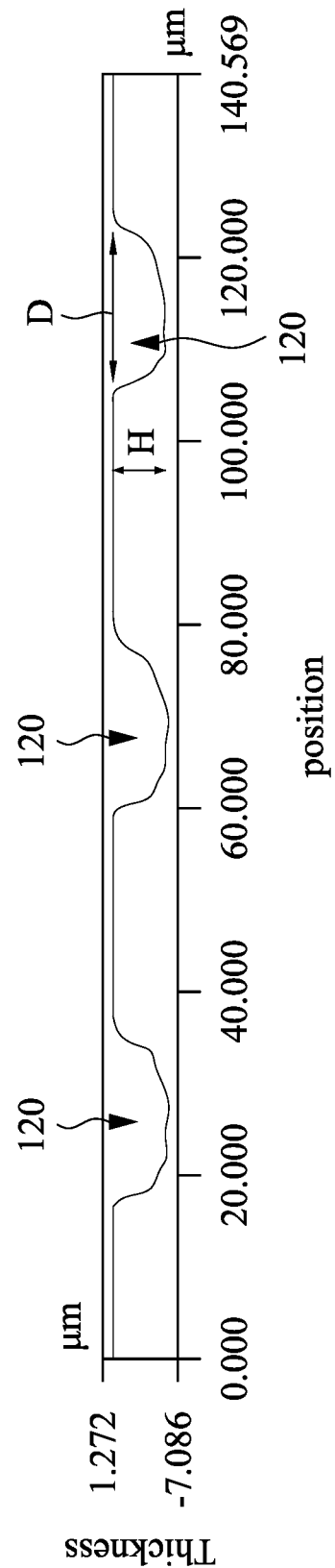
FIG. 4B is a cross-sectional view taken along line 4B-4B in FIG. 4A.

FIG. 4A is a top view of an optical film according to a third embodiment of the disclosure with quadrilateral micro-structure defined region. FIG. 4B is a cross-sectional view taken along line 4B-4B in FIG. 4A. In the third embodiments, each of the micro-structures 120 may have an ellipse top view having a long axis $D_L$ of about 18.7 micrometers and a short axis $D_S$ of about 16.4 micrometers. An axis ratio of the short axis $D_S$ to the long axis $D_L$ may be in a range from about 0.5 to about 1. For example, in FIG. 4A, the micro-structures 120 have an axis ratio of about 0.88. Each of the micro-structures 120 may have its center at an intersecting point of the long axis $D_L$ and the short axis $D_S$. The micro-structures 120 are arranged such that their long axes $D_L$ are parallel to each other, and their short axes $D_S$ are parallel to each other. The average area density of the micro-structures of the optical film 100 is about 0.5. The micro-structure distribution uniformity (DU) is about 0.658. In the third embodiments, the micro-structures 120 are recesses, and each of the micro-structures may have a depth-to-width aspect ratio of about 0.38 for the short axis and a depth-to-width aspect ratio of about 0.33 for the long axis. The depth-to-width aspect ratio is a ratio of the depth H to the characteristic dimension D in FIG. 4B.

In FIGS. 2A, 3A, and 4A, the micro-structure distribution uniformity (DU) is the ratio of an area of a first micro-structure defined region (e.g., the region LR1) to an area of a second micro-structure defined region (e.g., the region LR2). Each of the micro-structure defined regions (e.g., the regions LR1 and LR2) is defined by selecting a main micro-structure 120A and four auxiliary micro-structures 120B neighboring the main micro-structure 120A, and connecting centers of every two adjacent auxiliary micro-structures 120B with a straight line, the plural straight lines forming a quadrilateral micro-structure defined region (e.g., the region LR1/LR2). Stated differently, each micro-structure defined region (e.g., the regions LR1 and LR2) can be an enclosed contour consists of four auxiliary micro-structures 120B located around a main micro-structure 120A, and the main micro-structure 120A can be randomly selected/picked-up in the whole area.

As shown in FIGS. 2A, 3A, and 4A, for each of the micro-structure defined regions (e.g., the region LR1/LR2), each of the auxiliary micro-structures 120B has a first portion in the micro-structure defined region (e.g., the region LR1/LR2) and a second portion out of the micro-structure defined region (e.g., the region LR1/LR2). For some micro-structure defined regions (e.g., the regions LR1 and LR2 in FIG. 2A, the region LR2 in FIG. 3A, and the region LR2 in FIG. 4A), an entirety of the main micro-structure 120A may be in the micro-structure defined region. For some micro-structure defined regions (e.g., the region LR1 in FIG. 3A and the region LR1 in FIG. 4A), the main micro-structure 120A may have a first portion in the micro-structure defined region and a second portion out of the micro-structure defined region. Although the micro-structure defined regions (e.g., the region LR1/LR2) are quadrilaterals in FIGS. 2A, 3A, and 4A, they may have other shapes.

In the embodiments of FIGS. 2A, 3A, and 4A, the DU, the micro-structure average area density, the characteristic dimension of the micro-structure, and the aspect ratio of the micro-structure may comply with the aforementioned design rule for achieving the anti-rainbow performance and the speckle-solving performance.

Figure 5:
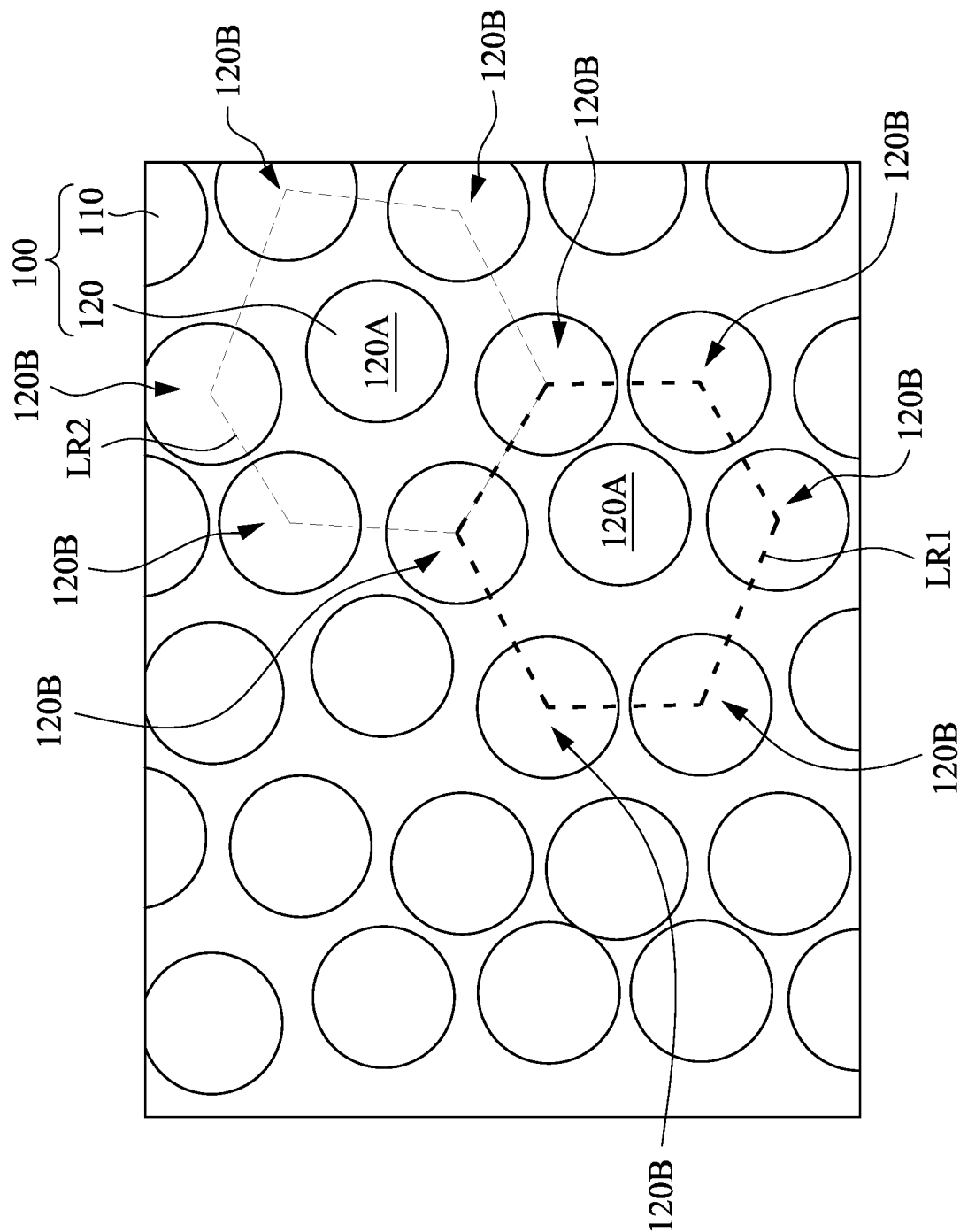
FIG. 5 is a top view of an optical film according to the second embodiment of the disclosure with hexagonal micro-structure defined region.

FIG. 5 is a top view of an optical film according to the second embodiment of the disclosure with hexagonal micro-structure defined region. The structural configuration of the optical film of FIG. 5 is the same as that of FIG. 3A, except that each micro-structure defined region (e.g., the region LR1/LR2) is a hexagon, and the micro-structure distribution uniformity (DU) is 0.909.

In FIG. 5, the micro-structure distribution uniformity (DU) is the ratio of an area of a first micro-structure defined region (e.g., the region LR1) to an area of a second micro-structure defined region (e.g., the region LR2). Each of the micro-structure defined regions (e.g., the regions LR1 and LR2) is defined by selecting a main micro-structure 120A and six auxiliary micro-structures 120B neighboring the main micro-structure 120A, and connecting centers of every two adjacent auxiliary micro-structures 120B with a straight line, the plural straight lines forming a hexagonal micro-structure defined region (e.g., the region LR1/LR2). Stated differently, each micro-structure defined region (e.g., the regions LR1 and LR2) can be an enclosed contour consists of six auxiliary micro-structures 120B located around a main micro-structure 120A, and the main micro-structure 120A can be randomly selected/picked-up in the whole area.

Figure 6:
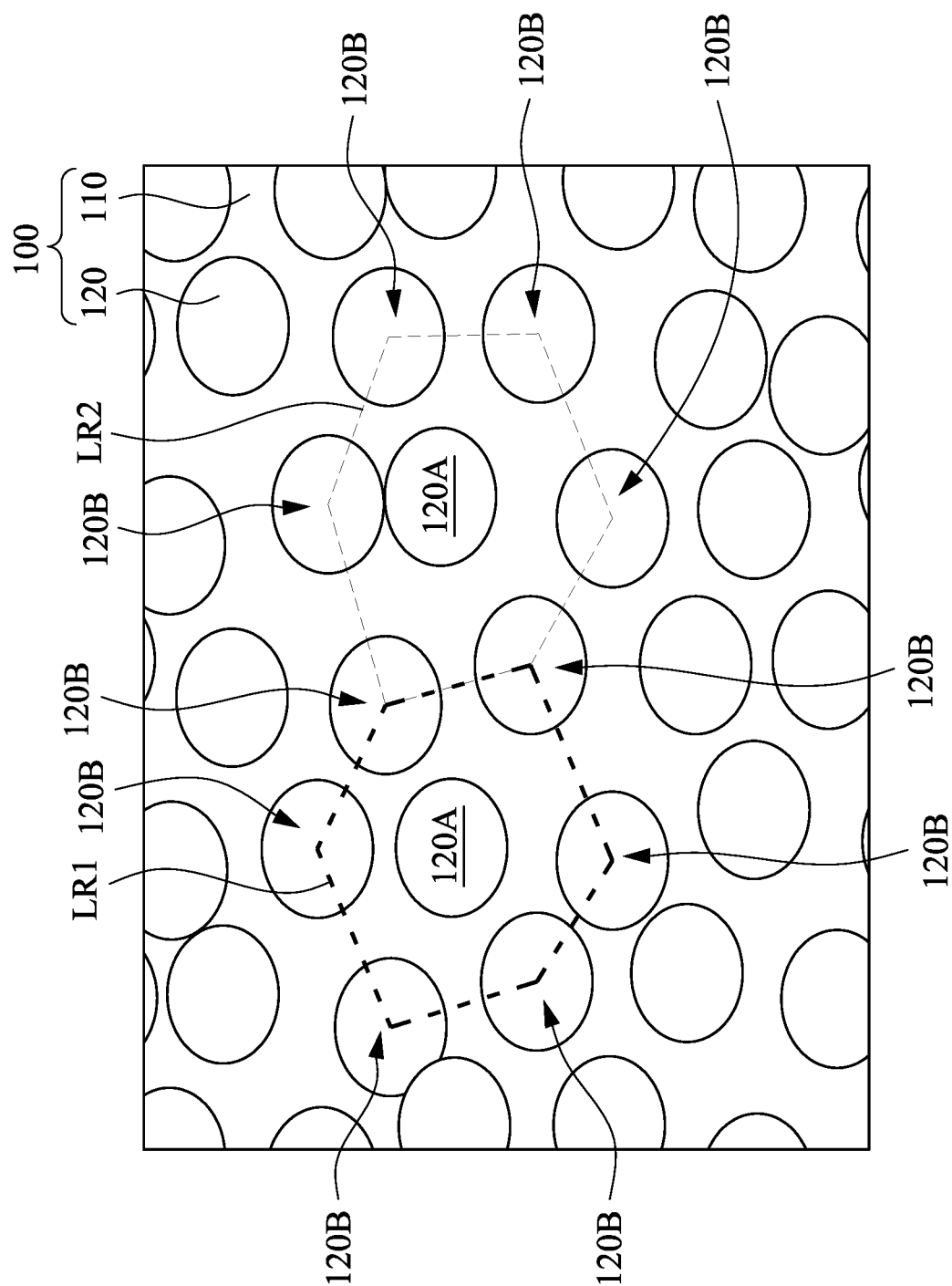
FIG. 6 is a top view of an optical film according to the third embodiment of the disclosure with hexagonal micro-structure defined region.

FIG. 6 is a top view of an optical film according to the third embodiment of the disclosure with hexagonal micro-structure defined region. The structural configuration of the optical film of FIG. 6 is the same as that of FIG. 4A, except that each micro-structure defined region (e.g., the region LR1/LR2) is a hexagon, and the micro-structure distribution uniformity (DU) is 0.887.

In FIG. 6, the micro-structure distribution uniformity (DU) is the ratio of an area of a first micro-structure defined region (e.g., the region LR1) to an area of a second micro-structure defined region (e.g., the region LR2). Each of the micro-structure defined regions (e.g., the regions LR1 and LR2) is defined by selecting a main micro-structure 120A and six auxiliary micro-structures 120B neighboring the main micro-structure 120A, and connecting centers of every two adjacent auxiliary micro-structures 120B with a straight line, the plural straight lines forming a hexagonal micro-structure defined region (e.g., the region LR1/LR2). Stated differently, each micro-structure defined region (e.g., the regions LR1 and LR2) can be an enclosed contour consists of six auxiliary micro-structures 120B located around a main micro-structure 120A, and the main micro-structure 120A can be randomly selected/picked-up in the whole area.

Figure 7A:
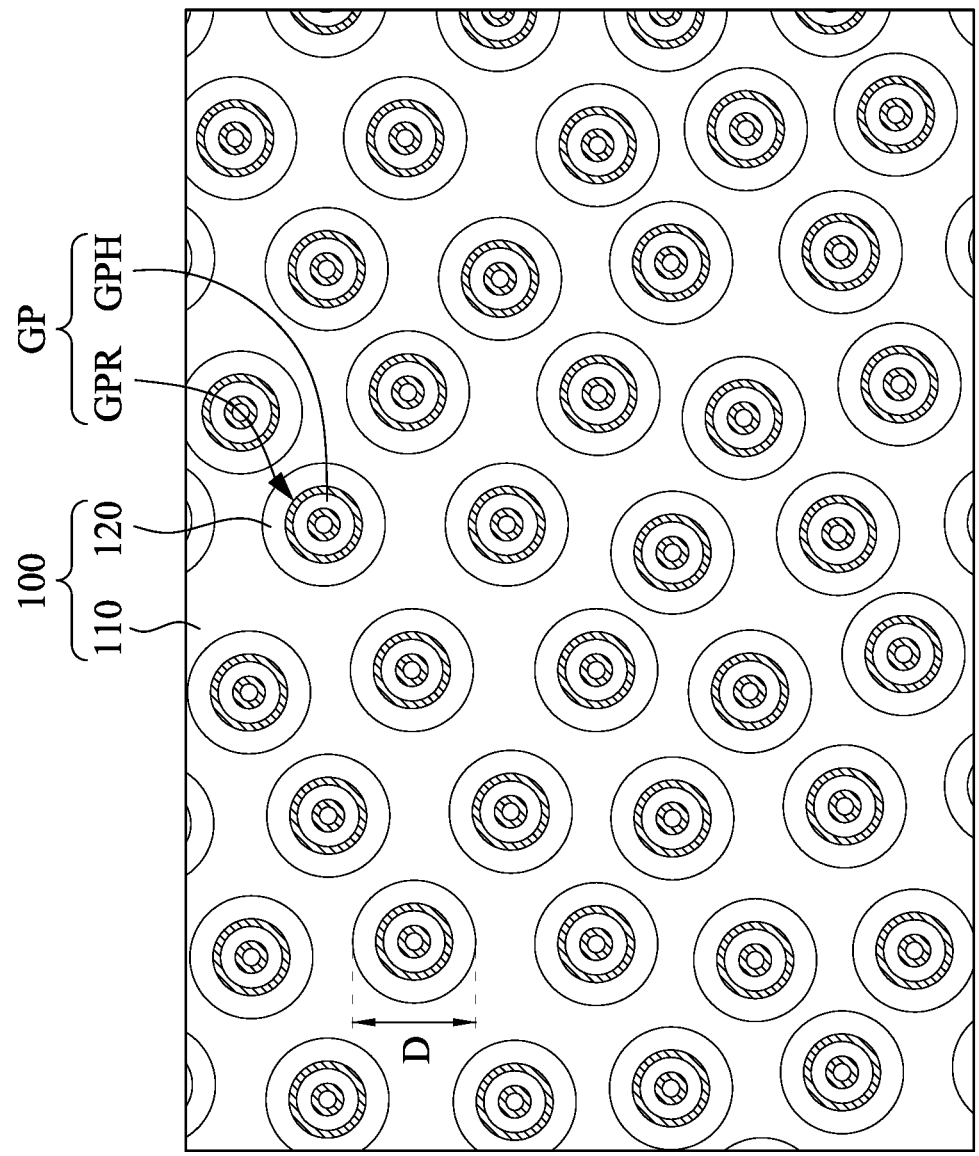
FIG. 7A is a top view of an optical film according to a fourth embodiment of the disclosure.
Figures 7B, 7C:
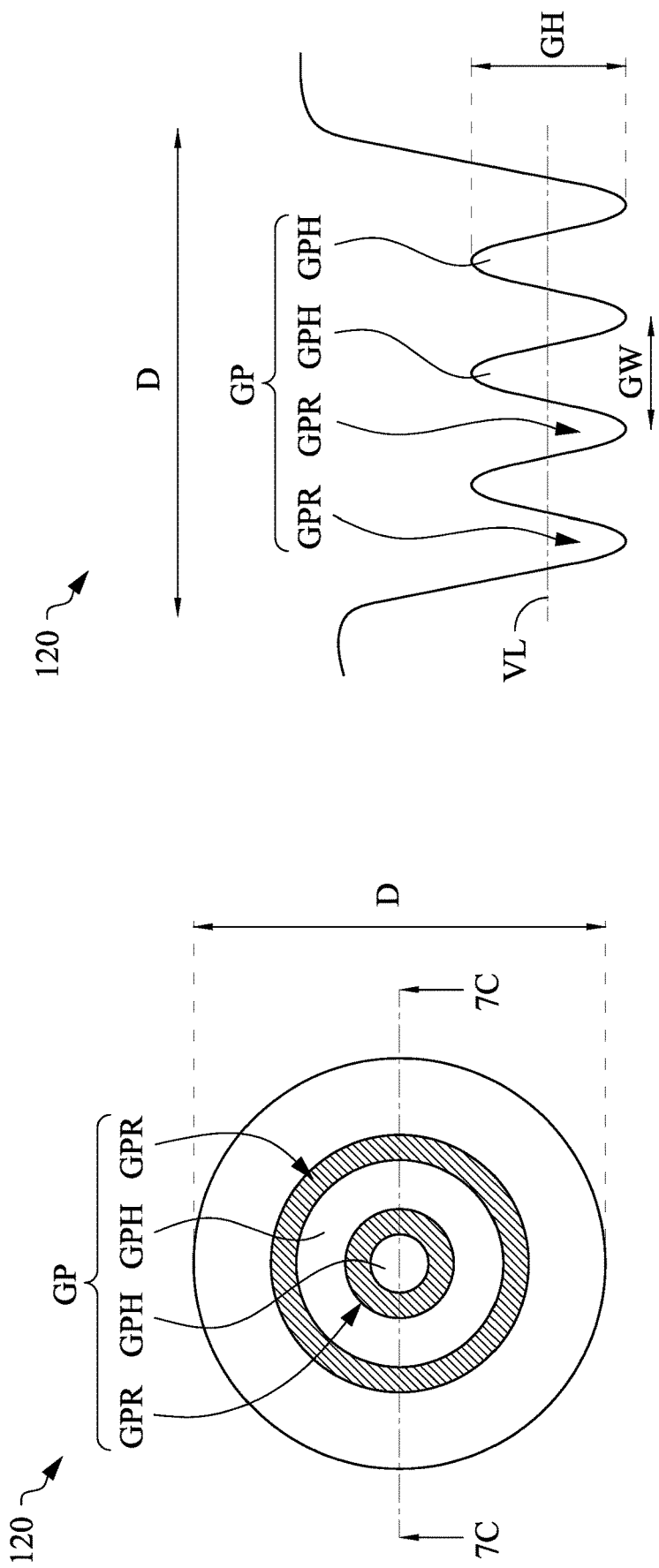
FIG. 7B is a schematic top view of a micro-structure of the optical film of FIG. 7A.
FIG. 7C is a cross-sectional view taken along line 7C-7C in FIG. 7B.

FIG. 7A is a top view of an optical film 100 according to a fourth embodiment of the disclosure. FIG. 7B is a schematic top view of a micro-structure of the optical film of FIG. 7A. FIG. 7C is a cross-sectional view taken along line 7C-7C in FIG. 7B. In the fourth embodiments, each of the micro-structures 120 may have a circle top view having a diameter D of about 12 micrometers, and a grating pattern GP inside the circle. The grating pattern GP may include plural recesses and/or protrusions inside a recessed or protruding micro-structure 120. For example, in the present embodiments, the grating pattern GP includes protrusions GPH and recesses GPR inside a recessed micro-structure 120. In the present embodiments, the grating pattern GP is illustrated as a sine-wave circular grating having the protrusions GPH and the recesses GPR concentrically arranged. In some alternative embodiments, the grating pattern GP may be a square-wave grating. And, the grating pattern GP may have other configurations, such as one-dimensional (1D) pattern or two-dimensional (2D) pattern, not limited to the circular pattern. In the present embodiments, the grating pattern GP may have the same height GH and a same grating pitch/period GW. In some alternative embodiments, the grating pattern GP may have different heights and/or different pitches/periods.

In FIG. 7C, the grating pattern GP is illustrating as a wave with positive peaks and negative peaks, a base line VL of the grating pattern GP is shown between the positive peaks and negative peaks. The hatched region in FIG. 7B may indicate portions of the grating pattern below a virtual line VL of the grating pattern GP (e.g., from the base line VL to the negative peaks of the amplitude of the grating pattern GP), which corresponds to the recesses GPR. The clear region in FIG. 7B may indicate portions of the grating pattern above the virtual line VL of the grating pattern GP (e.g., from the base line VL to the positive peaks of the amplitude of the grating pattern GP), which corresponds to the protrusions GPH.

In some embodiments, for achieving the desired diffraction energy distribution, the grating pitch/period GW is less than the diameter D of the micro-structure 120, and the depth-to-width aspect ratio of the grating pattern GP (i.e., a ratio of the height GH to the grating pitch/period GW) may be in a range from about 0.1 to about 2. For example, in the present embodiments, a grating pitch/period GW may be about 3.5 micrometers, a height of the grating pattern GP may be in range from about 3 micrometers, and thus the grating pattern GP may have a depth-to-width aspect ratio of about 0.85. Furthermore, in the present embodiments, the average area density of the micro-structures 120 of the optical film 100 is about 0.42. The micro-structure distribution uniformity (DU) is about 0.95. The DU, the micro-structure average area density, and the characteristic dimension of the micro-structure 120 may comply with the aforementioned design rule for achieving the anti-rainbow performance and the speckle-solving performance. Other details of the present embodiments are similar to the aforementioned, and thereto not repeated herein.

Figure 8A:
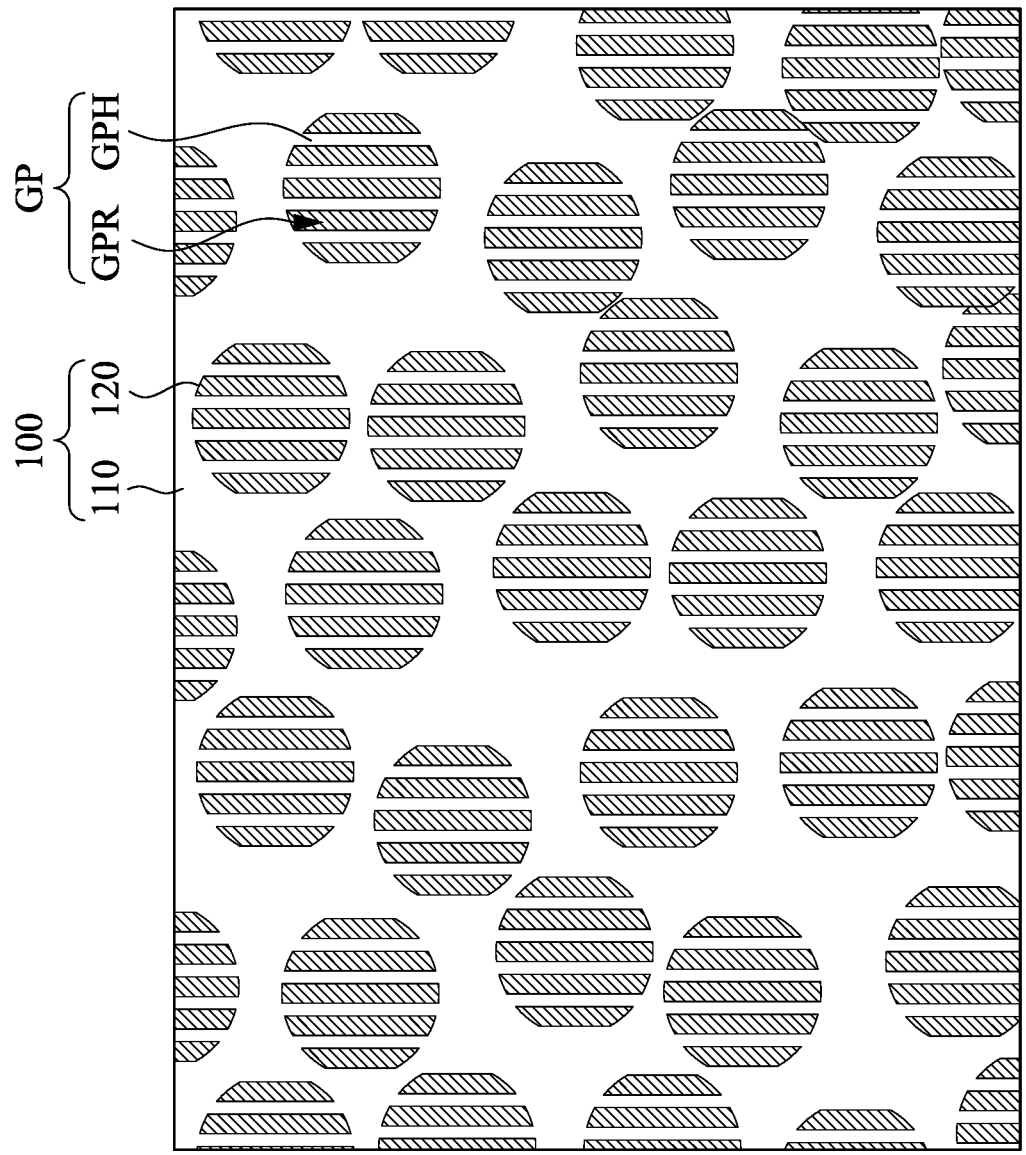
FIG. 8A is a top view of an optical film according to a fifth embodiment of the disclosure.

FIG. 8A is a top view of an optical film 100 according to a fifth embodiment of the disclosure. FIG. 8B is a schematic top view of a micro-structure 120 of the optical film 100 of FIG. 8A. Details of the present embodiments are similar to that of the fourth embodiments of FIGS. 7A-7C, except that the grating pattern GP is a one-dimensional (1D) grating. For example, the protrusions GPH and the recesses GPR extends along a same direction Y as shown in FIGS. 8A and 8B. The DU, the micro-structure average area density, the characteristic dimension of the micro-structure 120, and the depth-to-width aspect ratio of the grating pattern GP may comply with the aforementioned design rule for achieving the anti-rainbow performance and the speckle-solving performance. Other details of the present embodiments are similar to those of FIGS. 7A-7C, and thus not repeated herein.

Figure 9:
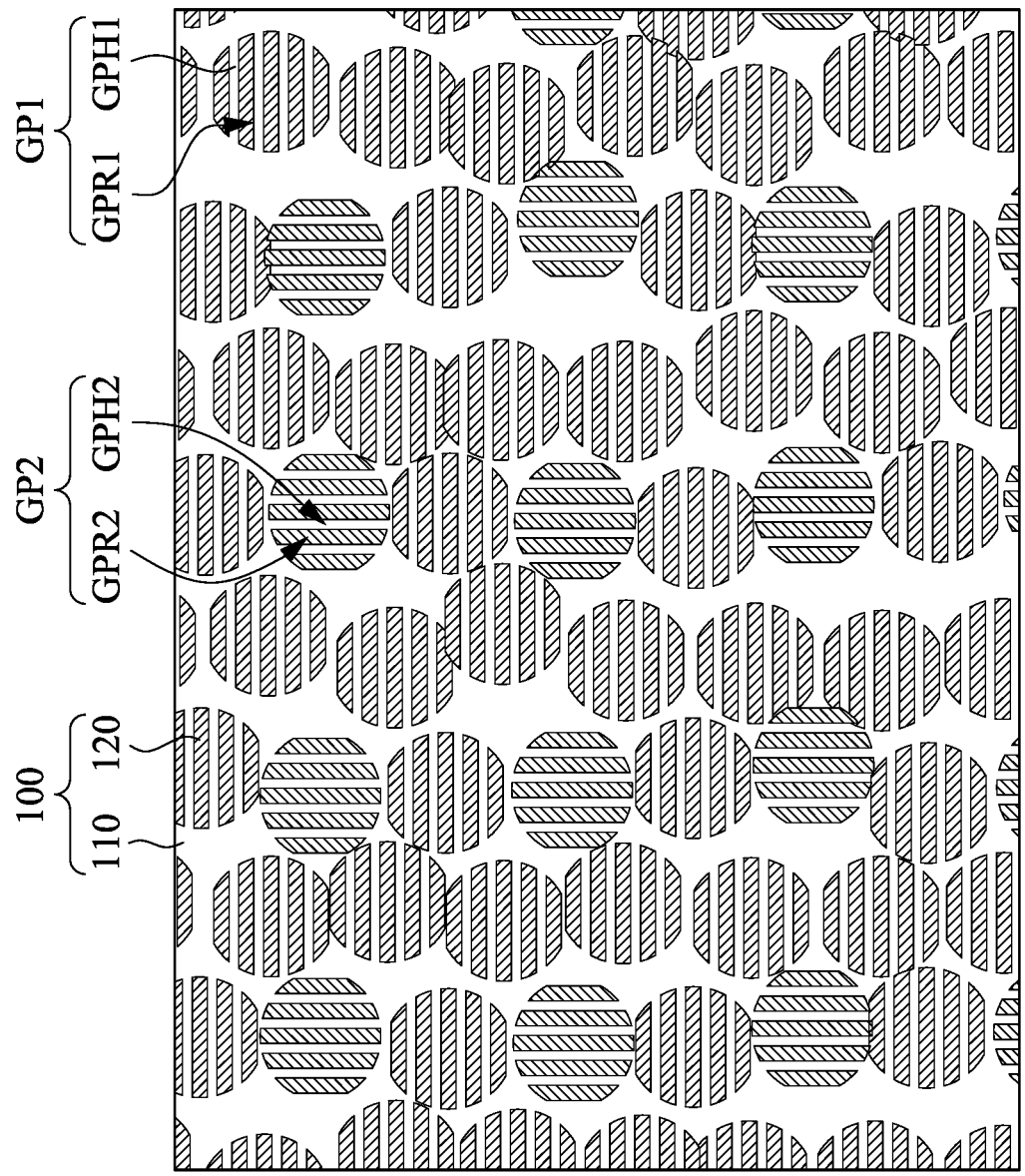
FIG. 9 is a top view of an optical film according to a sixth embodiment of the disclosure.

FIG. 9 is a top view of an optical film 100 according to a sixth embodiment of the disclosure. Details of the present embodiments are similar to that of the fifth embodiments of FIGS. 8A and 8B, except that the optical film 100 includes two kinds of micro-structures 120, and the two kinds of micro-structures 120 includes 1D grating patterns in different orientations. In the present embodiment, a first kind of the micro-structures 120 include a 1D grating pattern GP1, and a second kind of the micro-structures 120 include a 1D grating pattern GP2. For example, the protrusions GPH1 and the recesses GPR1 of the 1D grating pattern GP1 extends along the direction X, the protrusions GPH2 and the recesses GPR2 of the 1D grating pattern GP2 extends along the direction Y intersecting the direction X. The direction Y may be orthogonal to the direction X in the present embodiments. The DU, the micro-structure average area density, the characteristic dimension of the micro-structure 120, and the depth-to-width aspect ratio of the grating pattern GP may comply with the aforementioned design rule for achieving the anti-rainbow performance and the speckle-solving performance. Other details of the present embodiments are similar to those of FIGS. 7A-7C, and thus not repeated herein.

Figure 10:
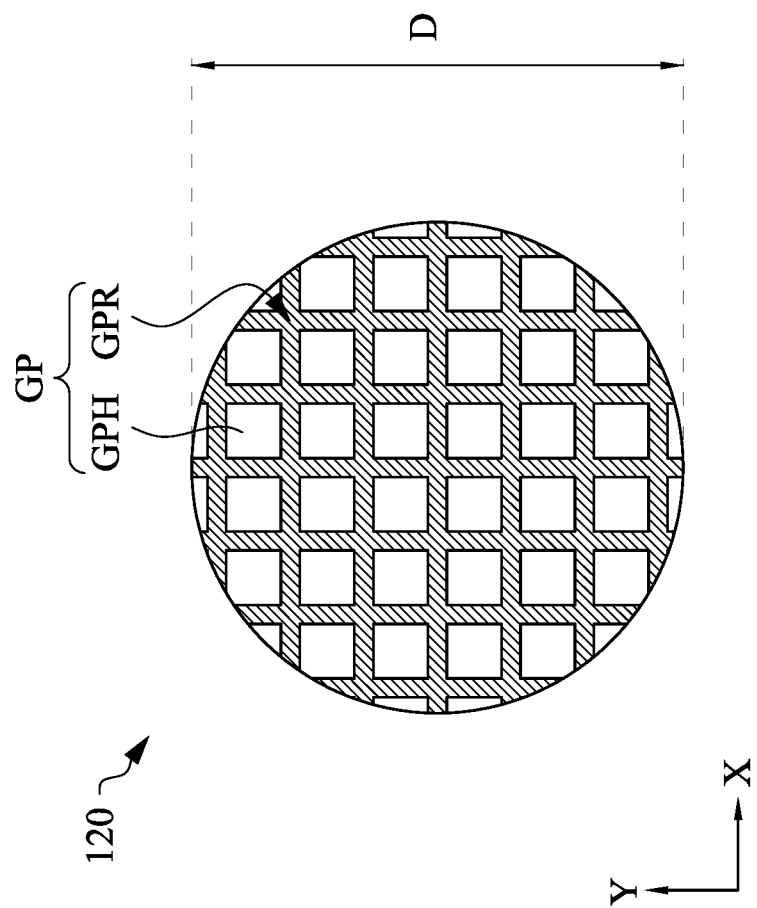
FIG. 10 is a schematic top view of a micro-structure according to a seventh embodiment of the disclosure.

FIG. 10 is a schematic top view of a micro-structure 120 according to a seventh embodiment of the disclosure. Details of the present embodiments are similar to that of the fifth embodiments of FIGS. 8A and 8B, except that the grating pattern GP is a two-dimensional (2D) grating. For example, the recess GPR have portions extending along the direction X and portions extending along the direction Y, thereby forming a mesh pattern. And, the protrusions GPH may be islands in the mesh pattern of the recess GPR. The DU, the micro-structure average area density, the characteristic dimension D of the micro-structure 120, and the depth-to-width aspect ratio of the grating pattern GP may comply with the aforementioned design rule for achieving the anti-rainbow performance and the speckle-solving performance. Other details of the present embodiments are similar to those of FIGS. 7A-7C, and thus not repeated herein.

Figure 11B:
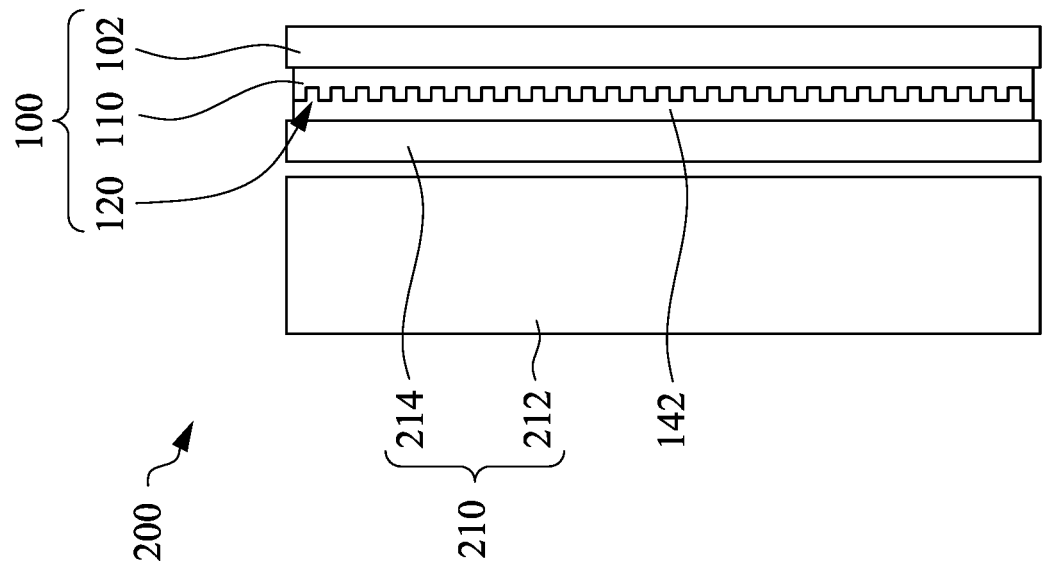
FIG. 11B is a schematic cross-sectional view of a display device including an optical film according to some embodiments of the disclosure.
Figure 11A:
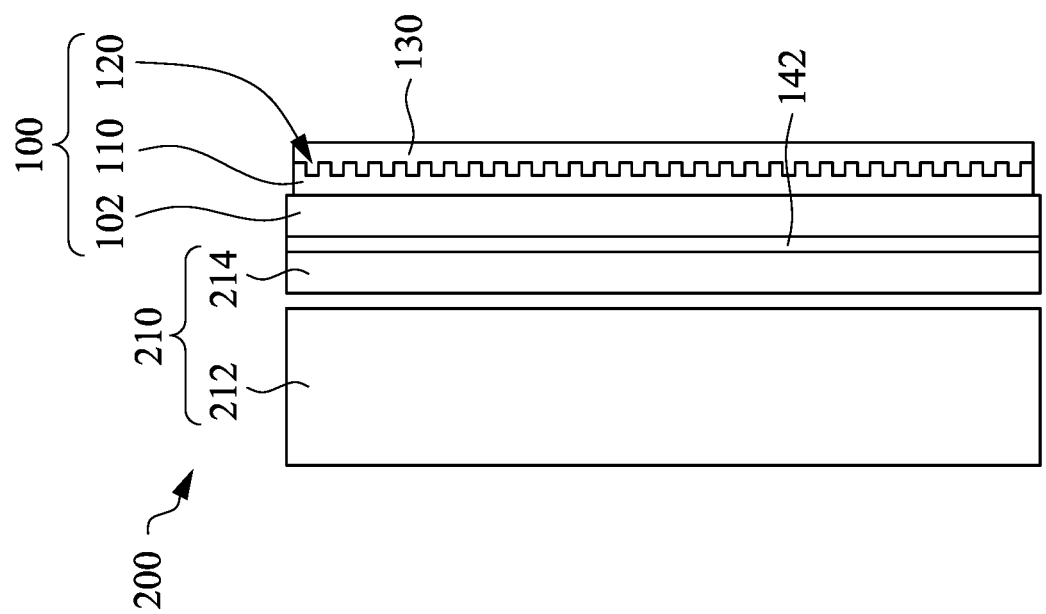
FIG. 11A is a schematic cross-sectional view of a display device including an optical film according to some embodiments of the disclosure.

FIG. 11A is a schematic cross-sectional view of a display device 200 including an optical film 100 according to some embodiments of the disclosure. The display device 200 may include a display 210 and an optical film 100 disposed on a light output surface of the display 210. The display 210 can be a liquid crystal display, a plasma display, an organic light-emitting diode (OLED) display, an electronic paper display or other display for displaying an image. For example, the display 210 may include a backlight module 212 and a liquid crystal element (e.g., liquid crystal panel) 214. The backlight module 212 may provide light to the liquid crystal element 214. The liquid crystal element 214 includes arrayed pixels, each of the arrayed pixels has a voltage-dependent transmittance, thereby displaying an image. The display 210 can be combined with other elements. For example, the display 210 can be combined with a touch element to form a touch panel.

Due to the periodic array of pixels, in absence of the optical film 100, the display 210 may show severe color-glare issues (rainbow reflection) at specific ambient light, such as project lamp, spotlight or sunlight. By disposing the optical film 100 on the display surface of the display 210, the rainbow reflection would be reduced.

In the present embodiments, the micro-structures 120 may face away from the display 210, and a cover layer 130 may cover and protect the micro-structures 120. The cover layer 130 may be made of suitable polymeric materials. For example, the cover layer 130 may be cured UV adhesive. In some embodiments where the micro-structures 120 are recesses the cover layer 130 may fill up the recessed micro-structures 120. In some alternative embodiments where the micro-structures 120 are protrusions, the cover layer 130 fill spaces between the protruding micro-structures 120. For the optical diffraction performance, in the visible spectrum, a difference between a refraction index of the cover layer 130 and a refraction index of the micro-structures 120 (or the film body 110) may be in a range from about 0.01 to about 0.4. In the present embodiments, an adhesive layer 142 may attach the optical film 100 (e.g., the transparent support 102) to the display 210. The adhesive layer 142 may be suitable adhesives, such as pressure-sensitive adhesive (PSA), optical clear adhesive (OCA), or other suitable optical adhesives.

FIG. 11B is a schematic cross-sectional view of a display device 200 including an optical film 100 according to some embodiments of the disclosure. Details of the present embodiments are similar to that of FIG. 11A, except that the micro-structures 120 may face the display 210. In some embodiments where the micro-structures 120 are recesses, the adhesive layer 142 may fill up the recessed micro-structures 120. In some alternative embodiments where the micro-structures 120 are protrusions, the adhesive layer 142 fill spaces between the protruding micro-structures 120. For optical diffraction performance, in the visible spectrum, a difference between a refract index of the adhesive layer 142 and a refraction index of the micro-structures 120 (or the film body 110) is in a range from about 0.01 to about 0.4. Through the configuration, the cover layer 130 of FIG. 11A may be omitted. Other details of the present embodiments are similar to that of previous embodiments, and thereto are not repeated herein.

Figure 12B:
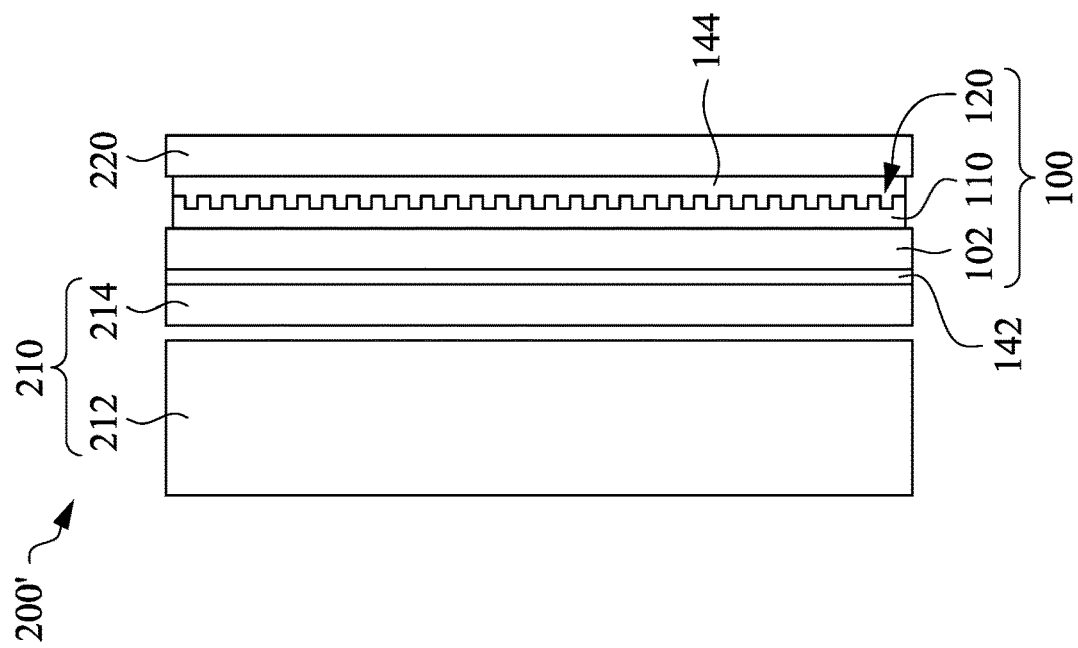
FIG. 12B is a schematic cross-sectional view of a display device including an optical film according to some embodiments of the disclosure.
Figure 12A:
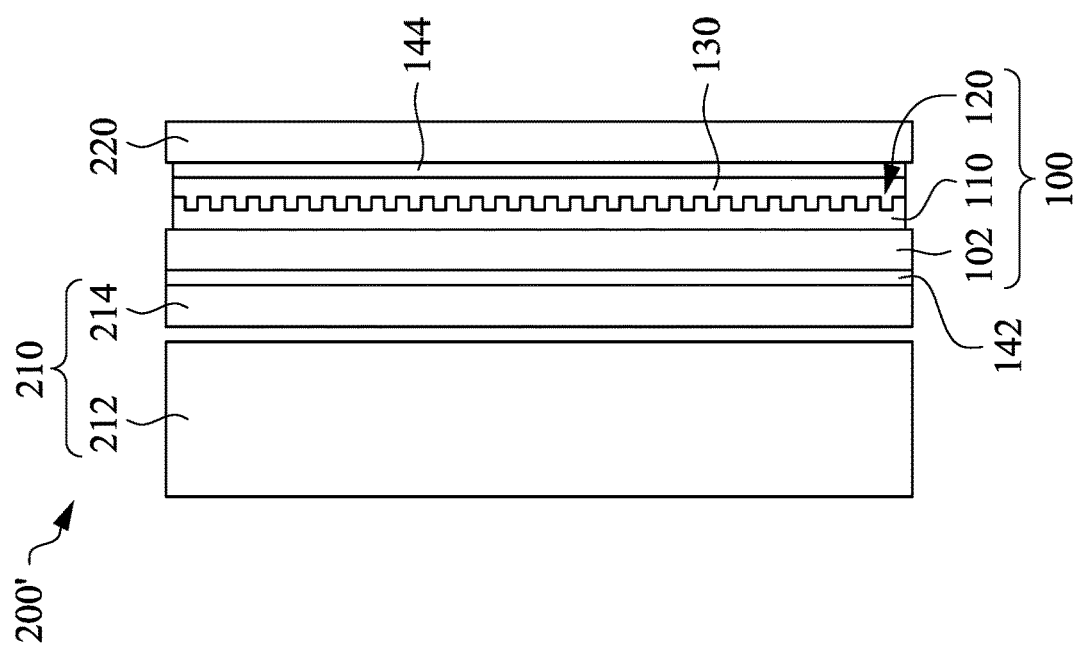
FIG. 12A is a schematic cross-sectional view of a display device including an optical film according to some embodiments of the disclosure.

FIG. 12A is a schematic cross-sectional view of a display device 200' including an optical film according to some embodiments of the disclosure. The display device 200' further includes a liquid crystal element (e.g., liquid crystal panel) 220, and the aforementioned optical film 100 is between the display 210 and the liquid crystal element 220. The liquid crystal element 220 may provide phase modulation by applying voltage, thereby adjusting the viewing angle of the display device 200', such that the display device 200' can switch between a wide-viewing angle mode or a narrow-viewing mode (e.g., privacy mode). The optical film 100 having a suitable angle-dependent transmittance may optically couple between the display 210 and the liquid crystal element 220.

In absence of the optical film 100, moiré interference may occur due to overlapping the liquid crystal elements 214 and 220. The designed optical film 100 with the well-controlled random arrangement and diffraction property, can have a suitable haze value (e.g., from about 1% to about 5%) like a diffuser but without speckle. Therefore, by the insertion of the optical film 100 between the liquid crystal elements 214 and 220, the moiré interference can be reduced.

In the present embodiments, the micro-structures 120 may face away from the display 210, and a cover layer 130 may cover and protect the micro-structures 120. An adhesive layer 142 may attach the optical film 100 (e.g., the transparent support 102) to the display 210, and an adhesive layer 144 may attach the cover layer 130 to the liquid crystal element 220. The adhesive layers 142 and 144 may be suitable adhesives, such as pressure-sensitive adhesive (PSA), optical clear adhesive (OCA), or other suitable optical adhesives. In some alternative embodiments, the micro-structures 120 may face the display 210, and the cover layer 130 may be between the optical film 100 and the display 210 for covering the micro-structures 120. Other details of the present embodiments are similar to those mentioned previously, and thereto not repeated herein.

FIG. 12B is a schematic cross-sectional view of a display device 200' including an optical film 100 according to some embodiments of the disclosure. Details of the present embodiments are similar to that of FIG. 12A, except that at least one of the adhesive layers 142 and 144 may fill the spaces in or between the micro-structures 120. Through the configuration, the cover layer 130 of FIG. 12A may be omitted. In the present embodiments, the micro-structures 120 may face away from the display 210, and the adhesive layer 144 fill the spaces in or between the micro-structures 120. In some alternative embodiments, the micro-structures 120 may face the display 210, and the adhesive layer 142 fill the spaces in or between the micro-structures 120. For optical diffraction performance, in the visible spectrum, a difference between a refract index of the adhesive layer 142/144 that covering the micro-structures 120 and a refraction index of the micro-structures 120 (or the film body 110) is in a range from about 0.01 to about 0.4. Other details of the present embodiments are similar to that of previous embodiments, and thereto are not repeated herein.

Based on the above discussions, it can be seen that the present disclosure offers advantages over liquid crystal devices. It is understood, however, that other embodiments may offer additional advantages, and not all advantages are necessarily disclosed herein, and that no particular advantage is required for all embodiments. One advantage is that the micro-structures of the optical film may be arranged and designed with suitable characteristic dimension, suitable average micro-structure area density, suitable micro-structure distribution uniformity, and suitable aspect ratios, for improving optical quality and having desired angle-dependent transmittance. Another advantage is that the micro-structures may include various shapes, and the micro-structures may be recesses or protrusions.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical film, comprising:
 a film body; and
 a plurality of micro-structures randomly distributed over the film body, wherein the micro-structures respectively correspond to a plurality of regions, and each of the regions is defined by a same number of auxiliary micro-structures of the micro-structures around a main micro-structure of the micro-structures, and a ratio of an area of a minimum one of the regions to an area of a maximum one of the regions is greater than 0.5 and less than 1.

2. The optical film of claim 1, wherein the optical film further has an average area density being a ratio of a sum area of the micro-structures to an area of the film body, and the average area density is less than 0.75.

3. The optical film of claim 2, wherein the average area density is greater than 0.3.

4. The optical film of claim 1, wherein each of the auxiliary micro-structures has a first portion in said each of the regions and a second portion out of said each of the regions.

5. The optical film of claim 1, wherein an entirety of the main micro-structure is in said each of the regions.

6. The optical film of claim 1, wherein each of the regions is a polygon having a plurality of corners respectively over the auxiliary micro-structures.

7. The optical film of claim 6, wherein the corners of the polygon are respectively at centers of the auxiliary micro-structures.

8. The optical film of claim 1, wherein each of the regions is a polygon having at least two different inner angles.

9. The optical film of claim 1, wherein each of the regions is a quadrilateral.

10. The optical film of claim 1, wherein a first one of the regions has a shape different from that of a second one of the regions.

11. The optical film of claim 1, wherein a dimension of the micro-structures is in a range from 10 micrometers to 50 micrometers.

12. The optical film of claim 1, wherein an aspect ratio of the micro-structures is in a range from 0.12 to 1.

13. The optical film of claim 1, wherein the micro-structures are a plurality of protrusions over a top surface of the film body.

14. The optical film of claim 1, wherein the micro-structures are a plurality of recesses in the film body.

15. The optical film of claim 1, wherein the optical film has a zero-order transmittance less than 30% and a 5-degree angle range transmittance less than 50%.

16. The optical film of claim 15, wherein the zero-order transmittance of the optical film is less than 15%, and the 5-degree angle range transmittance of the optical film is less than 35%.

17. The optical film of claim 16, wherein the optical film has a 10-degree angle range transmittance less than 50%.

18. The optical film of claim 1, wherein at least one of the micro-structures comprises a grating pattern.

19. A display device, comprising:
A first display; and
the optical film of claim 1 disposed on a light output surface of the first display.

20. The display device of claim 19, further comprising:
a second display, wherein the optical film is between the first display and the second display.

* * * * *